United States Patent
Persson et al.

(10) Patent No.: US 9,454,397 B2
(45) Date of Patent: Sep. 27, 2016

(54) DATA PROCESSING SYSTEMS

(71) Applicant: ARM Limited, Cambridge (GB)

(72) Inventors: Hakan Persson, Bjarred (SE); Matt Evans, Cambridge (GB); Jason Parker, Cambridge (GB); Marc Zyngier, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 14/682,302

(22) Filed: Apr. 9, 2015

(65) Prior Publication Data
US 2015/0293774 A1 Oct. 15, 2015

(30) Foreign Application Priority Data
Apr. 9, 2014 (GB) .................................. 1406392.9

(51) Int. Cl.
*G06F 9/455* (2006.01)
*G06F 9/44* (2006.01)

(52) U.S. Cl.
CPC .......... *G06F 9/45558* (2013.01); *G06F 9/4405* (2013.01); *G06F 9/4411* (2013.01); *G06F 2009/45579* (2013.01)

(58) Field of Classification Search
CPC .................................................. G06F 9/45558
USPC ...................................................... 718/1–108
See application file for complete search history.

(56) References Cited

U.S. PATENT DOCUMENTS

| | | | |
|---|---|---|---|
| 6,311,204 B1* | 10/2001 | Mills ......................... | G06F 9/52 345/502 |
| 7,694,304 B2* | 4/2010 | Kissell .................. | G06F 8/4442 712/31 |
| 2005/0102674 A1* | 5/2005 | Tameshige ............ | G06F 9/5011 718/100 |

(Continued)

FOREIGN PATENT DOCUMENTS

| | | |
|---|---|---|
| EP | 2437161 A1 | 4/2012 |
| WO | 2013178245 A1 | 12/2013 |
| WO | 2014031833 A1 | 2/2014 |

OTHER PUBLICATIONS

Krakiwsky, Sean E., Laurence E. Turner, and Michal M. Okoniewski. "Acceleration of finite-difference time-domain (FDTD) using graphics processor units (GPU)." Microwave Symposium Digest, 2004 IEEE MTT-S International. vol. 2. IEEE, 2004. pp. 1033-1036.*

(Continued)

*Primary Examiner* — Satish Rampuria
(74) *Attorney, Agent, or Firm* — Vierra Magen Marcus LLP

(57) ABSTRACT

A data processing system includes one or more processors that each execute one or more operating systems that include one or more applications; an accelerator that provides a shared resource for a plurality of the applications; a storage area accessible by the processors and the accelerator; and one or more input/output interfaces for control of, or the submission of tasks to, the accelerator. To initialize one of the input/output interfaces, one of the one or more processors is capable of sending a first signal to the accelerator; the accelerator is capable of writing one or more selected pieces of information representative of one or more capabilities of the accelerator to the storage area and sending a second signal to the processor; the processor is capable of reading the one or more selected pieces of information from the storage area; and the accelerator is capable of configuring the input/output interface.

15 Claims, 5 Drawing Sheets

(56) References Cited

U.S. PATENT DOCUMENTS

| | | | |
|---|---|---|---|
| 2006/0200821 A1* | 9/2006 | Cherkasova | G06F 11/3423 718/1 |
| 2007/0052715 A1 | 3/2007 | Levit-Gurevich et al. | |
| 2009/0217275 A1* | 8/2009 | Krishnamurthy | G06F 9/5077 718/102 |
| 2012/0084774 A1 | 4/2012 | Post et al. | |
| 2013/0152099 A1* | 6/2013 | Bass | G06F 9/5027 718/103 |
| 2015/0089495 A1* | 3/2015 | Persson | G06F 9/45558 718/1 |

OTHER PUBLICATIONS

Engel, Klaus, Martin Kraus, and Thomas Ertl. "High-quality pre-integrated volume rendering using hardware-accelerated pixel shading." Proceedings of the ACM SIGGRAPH/EUROGRAPHICS workshop on Graphics hardware. ACM, 2001. pp. 9-17.*

Xu, Fang, and Klaus Mueller. "Accelerating popular tomographic reconstruction algorithms on commodity PC graphics hardware." Nuclear Science, IEEE Transactions on 52.3 (2005): pp. 654-663.*

Search Report dated Oct. 27, 2014 in GB Patent Application No. GB1406392.9, 3 pages.

Search Report dated Oct. 30, 2014 in GB Patent Application No. GB1406400.0, 3 pages.

Gupta et al. "GViM: GPU-accelerated Virtual Machines," 3rd Workshop on System-level Virtualization for High Performance Computing (HPCVirt09), Nuremberg, Germany, Association for Computing Machinery (ACM), Mar. 31, 2009, 8 pages.

Kadav et al. "Live Migration of Direct-Access Devices" Association for Computing Machinery (ACM), Jul. 2009, 7 pages.

Le Vasseur et al. "Standardized but Flexible I/O for Self-Virtualizing Devices" WIOV'08 Proceedings of the First conference on I/O virtualization, USENIX Association, Berkeley, CA Dec. 10, 2008, 7 pages.

Raj et al. "Self-Virtualized I/O: High Performance, Scalable I/O Virtualization in Multi-core Systems" Georgia Institute of Technology, [retrieved from http://cercs.gatech.edu/tech-reports/tr2006/git-cercs-06-02.pdf], 2006, 23 pages.

Zhai et al. "Live Migration with Pass-through Device for Linux VM" Proceedings of the Linux Symposium, vol. Two, Ottawa, Ontario, Canada, Jul. 23-26, 2008, 9 pages.

Search Report dated Oct. 27, 2014 in GB Patent Application No. GB1406393.7, 3 pages.

Search Report dated Sep. 28, 2015, in UK Patent Appl. No. GB1506013.0, 3 pages.

* cited by examiner

DATA PROCESSING SYSTEMS

BACKGROUND

The technology described herein relates to data processing systems in which an accelerator, such as a graphics processing unit (GPU), a video accelerator or a digital signal processor, etc., acts as a common shared resource for a plurality of applications (such as games, productivity applications, browsers, etc.) and in particular to a method and system for initialising such a data processing system.

Known virtualised data processing systems which use an accelerator as a common shared resource for a number of applications, e.g. running on different virtual machines (operating systems), operate in a number of different ways. In one such system, involving hardware virtualisation of network interface cards in a server, the virtual machines which run the operating system for the applications are connected directly to the network interface, i.e. this connection is static, and the interface between the virtual machine and the hardware is partly virtualised in order to communicate with the accelerator. This arrangement requires a specific device driver for the type of network interface being used for the initialisation of, and subsequent communication with, the interface.

In another such system a graphics accelerator may be partly virtualised by using a specific graphics driver that captures the commands from one virtual machine (operating system) to the graphics acceleration application programming interface (API), e.g. using DirectX or OpenGL, and then forwards them to a different virtual machine which has access to the graphics accelerator such that the commands can be executed. Clearly there is a large drawback in this arrangement because of the transfer of commands between the two operating systems (virtual machines), which is a complex arrangement and comes at a large processing cost.

In a third such system, a graphics accelerator is split into a fixed number of partitions, with each partition being assigned directly to a virtual machine, i.e. there a static connection as with the first example. An example of such a product is NVIDIA GRID.

The static connection between virtual machines and their interfaces to the accelerator, and the need to use specific drivers, in these known systems, means that existing virtualised systems are not very flexible, for example in terms of being able to dynamically manage the virtual machine connections to the accelerator.

BRIEF DESCRIPTION OF THE DRAWINGS

A number of embodiments of the technology described herein will now be described, by way of example only, and with reference to the accompanying drawings, in which.

DETAILED DESCRIPTION

Figure 1:
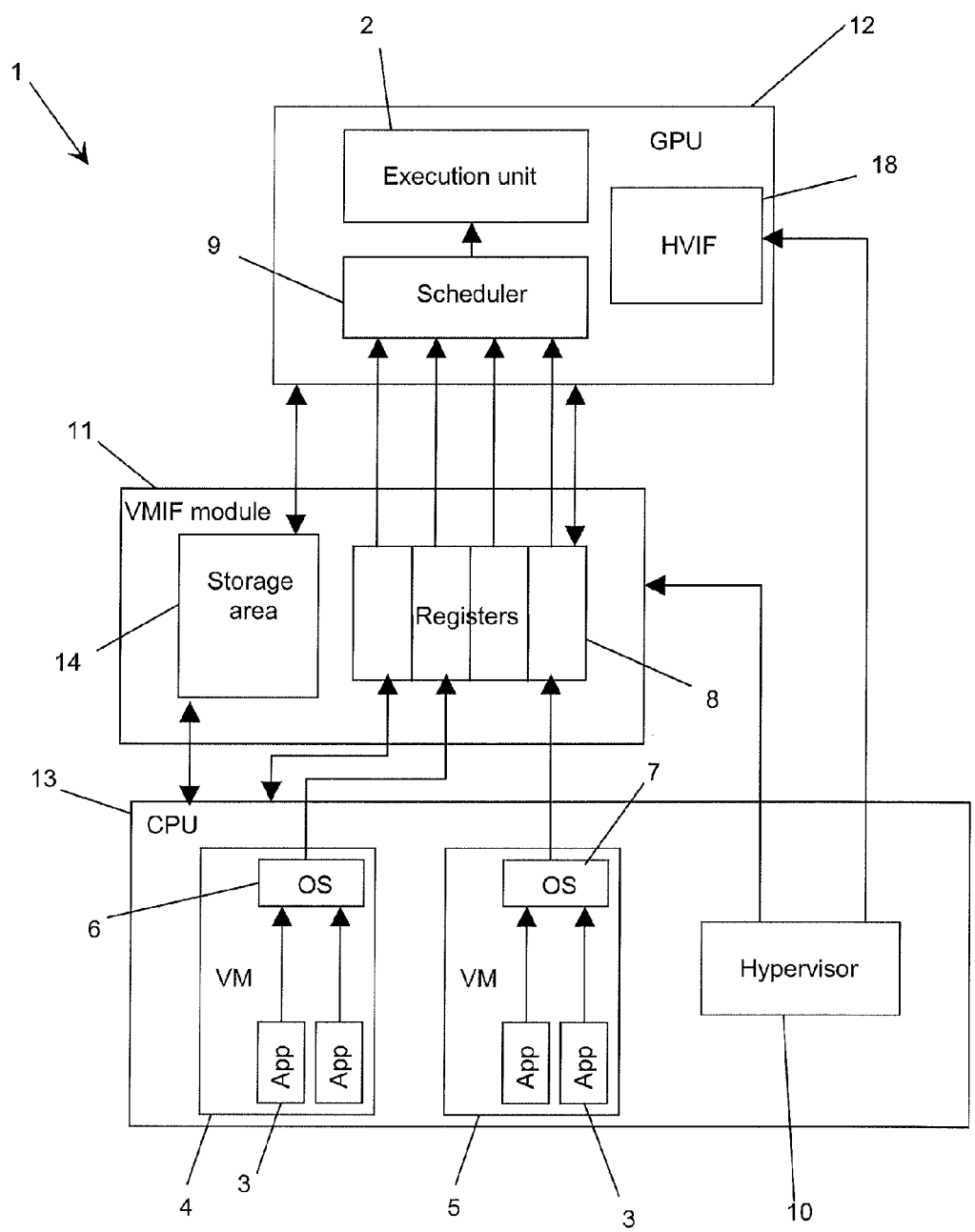
FIG. 1 shows schematically an embodiment of a data processing system in which an accelerator acts as a shared resource for a plurality of applications.

One embodiment of the technology described herein comprises a method of initialising an input/output interface for the control of, or the submission of tasks to, an accelerator that acts as a shared resource in a data processing system, wherein the data processing system comprises:

one or more processors that each execute one or more operating systems, each operating system including one or more applications;

an accelerator that provides a shared resource for a plurality of the applications;

a storage area accessible by at least the one or more processors and the accelerator; and one or more input/output interfaces for the control of, or the submission of tasks to, the accelerator;

the method comprising, to initialise one of the input/output interfaces:

one of the one or more processors sending a first signal to the accelerator;

the accelerator, in response to receiving the first signal, writing one or more selected pieces of information representative of one or more capabilities of the accelerator to the storage area, and sending a second signal to the processor;

the processor, in response to receiving the second signal, reading the one or more selected pieces of information from the storage area;

the processor sending a third signal to the accelerator; and the accelerator configuring the input/output interface in response to the third signal from the processor.

Another embodiment of the technology described herein comprises a data processing system comprising:

one or more processors that each execute one or more operating systems, each operating system including one or more applications;

an accelerator that provides a shared resource for a plurality of the applications;

a storage area accessible by at least the one or more processors and the accelerator; and one or more input/output interfaces for the control of, or the submission of tasks to, the accelerator;

wherein at least one of the one or more processors is arranged, to initialise one of the input/output interfaces, to send a first signal to the accelerator;

the accelerator is arranged to, in response to receiving the first signal, write one or more selected pieces of information representative of one or more capabilities of the accelerator to the storage area, and send a second signal to the processor;

the processor is arranged to, in response to the second signal, read the one or more selected pieces of information from the storage area, and send a third signal to the accelerator; and the accelerator is arranged to, in response to the third signal from the processor, configure the input/output interface.

The technology described herein relates to a process and system for initialising input/output interfaces to be used for the control of, and for the submission of tasks to, a shared accelerator in a data processing system that has an accelerator and one or more processors.

When an input/output interface for the accelerator is to be initialised, the accelerator and the processor which is requesting to initialise the interface exchange initialisation signals, i.e. perform a handshaking procedure. A first signal from the processor to the accelerator starts the initialisation process, i.e. this is effectively the initialisation request from the processor, and then the accelerator returns a second signal to the processor. Further signals may be exchanged between the processor and the accelerator, as will be discussed below.

The accelerator, in response to receiving the first signal from the processor, writes out information regarding its capabilities to a storage area that can be accessed by both the accelerator and the processor. This makes the capability information of the accelerator readily available to be read by the processor, and subsequently by further components, e.g. others of the one or more processors or the one or more operating systems, when they require this information. Generally, the accelerator and the one or more processors will have permission to write to and read from the storage area.

The processor, in response to receiving the second signal from the accelerator, reads the accelerator's capability information from the storage area, and then sends a third signal to the accelerator. This is the signal for the accelerator to configure the input/output interface.

Thus the technology described herein comprises an initialisation protocol that involves the exchange of defined signals between the accelerator and the processor, and the provision of certain information to a shared storage area. This allows the initialisation process to be used for multiple different types of interfaces, with only the specific details, e.g. the types of signals and/or the particular pieces of information, being tailored to the different interfaces being initialised, as will be discussed in more detail below.

The initialisation process of the technology described herein also allows the initialisation of different types of interfaces, e.g. a hypervisor interface, a power management interface and virtual machine interfaces, to be independent and thus to be carried out separately, with only the information required by each being exchanged, but while still using a common initialisation protocol. The initialisation process also allows the hypervisor to be able to run generic software, i.e. it does not require a specific driver to communicate with the accelerator, as it does not need to have specific knowledge of the accelerator, further than the capability information which has already been provided to the storage area by the accelerator during initialisation. This isolates the hypervisor from the details of the accelerator operation and facilitates dynamic management of the input/output interfaces which submit tasks to the accelerator, as will be discussed below.

The accelerator may be any suitable accelerator (execution/functional unit) that can provide a common resource to an application. It could, for example, comprise a graphics processing unit (GPU), an encryption accelerator, a video accelerator, a network (processing) interface, a digital signal processor (DSP), audio hardware, etc. The accelerator can essentially comprise any component that is optimised for a particular task. In one set of embodiments it comprises a graphics processing unit. The system may comprise only a single accelerator, though embodiments are envisaged in which the system comprises a plurality of accelerators.

The accelerator should, and in an embodiment does, comprise at least an execution unit (a functional unit) that is operable to perform tasks for applications. In an embodiment it also includes a task scheduler. In an embodiment, the accelerator also includes the input/output interfaces for the submission of tasks to the accelerator. Thus, in an embodiment, the accelerator comprises an execution unit, a task scheduler, and the input/output interfaces. Other arrangements would, of course, be possible.

In an embodiment there are one or more of the input/output interfaces that are used for the submission of tasks to the accelerator, and one or more input/output interfaces that are used for the control of the accelerator. In an embodiment the one or more of the input/output interfaces that are used for the submission of tasks to the accelerator comprise one or more (and, in an embodiment, a plurality of) virtual machine input/output interfaces which are used to submit tasks from the one or more operating systems (virtual machines) to the accelerator for execution.

Having multiple virtual machine input/output interfaces, e.g. four or eight, allows multiple operating systems (virtual machines) to be connected to the accelerator in parallel, thus allowing them to submit tasks simultaneously. Each operating system will, in an embodiment, be able to submit multiple tasks to an input/output interface to which it has been allocated.

In an embodiment the one or more of the input/output interfaces that are used for the control of the accelerator comprise one or more hypervisor input/output interfaces. Thus, in an embodiment, the data processing system comprises a hypervisor and at least one hypervisor input/output interface (although in an embodiment the data processing system comprises only a single hypervisor interface) which is used by the hypervisor to control the accelerator, e.g. to manage the allocation of the virtual machine interfaces to virtual machines.

In an embodiment hypervisor interface is in a fixed location, using a predefined data structure. This enables the hypervisor interface to know where the accelerator is in the memory map.

In an embodiment the system also comprises at least one power management input/output interface (although in an embodiment the data processing system comprises only a single power management interface) which is used to control the power consumption of the accelerator, e.g. through dynamic voltage and frequency scaling (DVFS).

Having a plurality of separate interfaces, each dedicated to a particular task, allows the system to separate different management tasks into these different interfaces, where the tasks can be managed separately and with direct access to the accelerator.

Thus it will be appreciated that in certain embodiments, the method and the system of the technology described herein allows multiple virtual machines in the system to be communicating directly with the accelerator, i.e. allowing the applications to access the accelerator's resources directly, with minimal intervention from the hypervisor. Furthermore, more virtual machines can have access to the accelerator than there are hardware resources, i.e. the number of virtual machines can be greater than the number of virtual machine input/output interfaces.

The simple initialisation protocol of the technology described herein, e.g. compared with the specific nature of interface initialisation in the prior art, which is common to each interface being initialised, and coupled with the fact that any virtual machine input/output interface can accept any virtual machine to connect thereto, reduces the burden of initialising an interface. This then allows dynamic management of the virtual machines and their connections via the input/output interfaces with the accelerator, because virtual machines can easily be swapped in and out of connection with the accelerator via the input/output interfaces owing to the ease of initialising a new interface.

Furthermore, migrating of virtual machines to other of the one or more processors and also to different accelerators is possible owing to the common initialisation protocol (as the common nature of the initialisation can thus be accepted by different accelerators), and straightforward owing to the simplicity of the initialisation protocol. Thus the virtualisation of the control plane can be operated in a very flexible manner, with separate control paths to the accelerator (and, in an embodiment, that are independent of the hypervisor and thus connect directly to the accelerator) for each virtual machine.

Each of the different types of input/output interfaces needs to be initialised before the respective input/output interface can be used for its primary purpose. The different types of input/output interfaces could be initialised at different stages, e.g. on start-up or power-up, or triggered by a particular state of the system, e.g. by the exchanged signals as will be discussed in more detail below. Depending on the type of the input/output interface, some interfaces may need to be initialised at multiple stages during operation of the system, while some may only need to be initialised once, e.g. on start-up.

In order to determine which of the input/output interfaces is to be initialised, in an embodiment the processor requesting the initialisation writes a set of initialisation parameters to the storage area, as will be described in more detail below.

The input/output interface(s) for the control of the accelerator (the hypervisor interface(s)) will generally be required to be (and, in an embodiment, are) initialised each time the system is powered on, e.g. on start-up or after a re-boot. A re-boot of the accelerator may happen as part of normal operation of the system, for example the accelerator may be powered down in a period when it is not being used and then re-booted when its resources are needed again. The initialisation of the hypervisor interface will generally follow the initialisation or re-boot of the accelerator (the details of which are generally known in the art and so will not be discussed further).

The initialisation of the accelerator may be the trigger for the initialisation of the hypervisor interface to start, e.g. after successful completion of the accelerator initialisation, so that the hypervisor interface can verify the capabilities of the accelerator during its initialisation, e.g. through the writing out of one or more selected pieces of the accelerator's capability information to the shared storage.

However, in an embodiment the initialisation of the hypervisor input/output interface is started by one of the one or more processors sending a signal to the accelerator using the process of the technology described herein.

In the set of embodiments in which the system comprises multiple input/output interfaces of the same type (e.g. virtual machine interfaces), these input/output interfaces need not be initialised all at the same time, e.g. they could just be initialised before they are required to be used. Such an example includes an input/output virtual machine interface which, in an embodiment, is initialised when a virtual machine has one or more tasks to submit to the accelerator for execution.

In addition, some types of input/output interfaces may need to wait for the initialisation of other types of input/output interfaces to be completed before they are initialised. For example, the initialisation of the task-submission input/output virtual machine interface(s) will generally require the initialisation of the input/output hypervisor interface(s) first, i.e. once the hypervisor interface has been initialised, in an embodiment the hypervisor interface then supports a set of simple commands for controlling the binding of the virtual machine interfaces to the virtual machines, following which the virtual machines can then independently initialise the task-submission (virtual machine) interfaces, e.g. without further involvement from the hypervisor.

However, in contrast to the initialisation of the hypervisor interface which is generally performed each time the system is powered up, this is not always necessary for the initialisation of the virtual machine interfaces which do not need to have knowledge of the power state of the system. Thus for example, when a number of input/output virtual machine interfaces have been initialised and the system is powered down and subsequently powered back up, the input/output hypervisor interface will generally need to be initialised again, but each of the input/output virtual machine interfaces that have already been initialised may not need to be re-initialised when the state of the input/output virtual machine interfaces has been saved before the system is powered down (and in an embodiment this is done) and can be restored after power up. There may, however, be instances in which the input/output virtual machine interfaces are closed down (without saving) before the accelerator is powered down and in that case they then need to be re-initialised when the accelerator is powered back up.

To facilitate the exchange of signals between the accelerator and the one or more processors, in an embodiment the system comprises a signalling mechanism that allows the accelerator and the one or more processors to communicate with each other. In an embodiment, the accelerator and the one or more processors are arranged to know how to respond to a signal sent by the other component. Thus the signals are used by the one or more processors and the accelerator to exchange messages therebetween, e.g. as a command or to indicate a state of the system or a particular component.

In an embodiment there is a defined set of signals sent to indicate to the other component that a certain event has occurred and/or that a certain task needs performing, e.g. that there is information to be read in the storage area or that the information should written out to the storage area, or that configuration of an input/output interface is desired. The signals could also be sent as a result of the selected pieces of information being written out to the storage area. This could simply be in response to the selected pieces of information being written out, or one or more signals could be exchanged to indicate that the selected pieces of information are valid, e.g. it has been successfully written out, or to indicate that the selected pieces of information have a particular value, e.g. indicative of a particular state of the system or that the initialisation process, or a part thereof, has been completed successfully or otherwise.

The signalling mechanism can be implemented in any desired and suitable fashion. In an embodiment the system comprises one or more registers, e.g. doorbell registers, for the exchange of signals between the accelerator and the one or more processors. In an embodiment, for each signal sent, the register is arranged to allow one way communication between the accelerator and the one or more processors, or vice versa. This could be achieved by using one set of bits in the register for sending signals from the accelerator to the one or more processors and using another set of bits in the register for sending signals from the one or more processors to the accelerator.

In a set of embodiments the accelerator and the one or more processors are arranged to send a number of different signals therebetween during the initialisation process and the sending of each of these different signals therefore constitutes a separate "event". In an embodiment these different signals are sent at different stages of the initialisation process and indicate different messages or commands, e.g. to indicate the state of a certain component and/or step in the initialisation process (e.g. the success or failure thereof), and/or that a certain command is being sent and therefore a certain task needs performing, with the accelerator and the one or more processors being arranged to know how to respond to each different signal they receive. Alternatively or additionally, following failure of a particular step in the initialisation process, e.g. configuration of the input/output interface, in an embodiment the initialisation process reverts back to a previous step, e.g. the accelerator writing one or more selected pieces of information representative of one or more capabilities of the accelerator to the storage area, and sending a second signal to the processor.

Sending different signals depending on the outcome of different stages of the initialisation process can help to indicate an error in the process and therefore a subsequent action which needs to be taken. The different signals exchanged may also indicate that the system needs to restart, suspend or abort the initialisation process, or jump back to a particular stage or step in the initialisation process. For example, when the initialisation of the input/output interface fails then it may not be necessary to restart the initialisation process from the beginning, it may be possible to go back to an intermediate step in the process.

The different signals can be distinguished as desired. When the signalling mechanism comprises a register, in an embodiment each bit (or set of bits) is used to "store" (indicate) a separate signal, i.e. different signals occupy different bits in the register. In order to send a signal the relevant bit in the register is "set", e.g. to 1. Alternatively a set of bits could be used to store different signal "values" (i.e. different values could be used to indicate different signals). In an embodiment once a signal has been received by a component, that component clears the signal, i.e. reverts it back to 0 in the register.

In an embodiment an "interrupt" or other event is also sent to the receiving component to indicate that a "signal" has been sent (e.g. set in the register).

Different signals may be used in a number of different circumstances, e.g. to send more than one message or command, with the same signal being used more than once during the initialisation process but, in an embodiment, at least some of the different signals are unique, i.e. reserved solely for a particular message or command so that they are separate and distinct from other signals that may be occurring in the system (at that time and/or otherwise).

These unique signals are easily provided, in the set of embodiments comprising a register, by each bit in the register being used to send a separate signal, i.e. each bit (or set of bits) is unique to a particular signal. The position of the bit in the register thus indicates the type of signal being sent, with the bit being set, e.g. to 1, when a signal is to be sent or left, e.g. as 0, when a signal has not been sent. This gives the benefit of only having to implement single bit signals.

In an embodiment the first and second signals, i.e. those sent to request and acknowledge the start of the initialisation, are reserved signals. This is particularly important as it enables any previous initialisation of the input/output interface in question which is currently running to be overridden and the initialisation restarted.

The Applicant has appreciated that this is important as it allows the processor to request the initialisation of an input/output interface at any time without conflicting with other requested operations. It also uniquely identifies these signals as being for the initialisation of an input/output interface. The priority of these signals could be indicated simply by their position in the register or their value, i.e. the receiving component (the accelerator or the one or more processors) knows which are the reserved signals. Alternatively a further priority flag could be set to accompany the signal which indicates the priority of the signal being sent. For example, the signal to request initialisation of an input/output interface (the first signal) may have the highest priority, e.g. by occupying bit 0 of the register (which is set when initialisation is requested), having a value of 0 or being accompanied by a priority flag of the highest order.

All these features of the exchanged signals help to ensure that the initialisation protocol is robust and thus an input/output interface is able to be initialised at any time, regardless of the state of the system. This handshaking procedure gives, in at least some embodiments, a failsafe mechanism for communication between the accelerator and the one or more processors, particularly when signals "reserved" for this purpose are used.

As also outlined in the main embodiments of the technology described herein, the system comprises a storage area, accessible by at least the accelerator and the one or more processors, to which information can be written out so that it can be accessed by another component. The storage area could at least in part be implemented by internal RAM.

In an embodiment the storage area, during the initialisation process, is used to store information (data) for use during the initialisation process, e.g. the accelerator's capability information and the initialisation parameters, in a fixed data structure. In an embodiment prior to storing this information, the content of the storage area is undefined, i.e. it contains no stable data that is safe to read.

After initialisation, in an embodiment, the storage area is configured as comprising one or more circular memory buffers for the storage of information, e.g. associated with the control of the accelerator or the submission of tasks to the accelerator. Thus the use and format of the storage area changes as the initialisation process progresses, in an embodiment with read and write indices being valid once the storage area has been configured as one or more circular memory buffers. In an embodiment the step of configuring the input/output interface comprises forming a circular memory buffer in the storage area for use by the component to which the input/output interface is allocated, e.g. the hypervisor or one of the virtual machines. Thus, in an embodiment, the hypervisor and each of the operating systems (virtual machines) to which an input/output interface has been allocated is allocated a region of the storage area in the form of one or more circular memory buffers.

As described above, in an embodiment the system comprises a register for the exchange of signals and a storage area for the storage of information that is used for the initialisation protocol (operation).

The data processing system may comprise a separate register for the exchange of signals together with a storage area for the storage of information for the purposes of the initialisation operation of the technology described herein.

However, in an embodiment the initialisation signalling, etc., is carried out over an input/output interface of the accelerator and, in an embodiment, over (using) the input/output interface that is to be initialised.

Thus, in an embodiment, the exchange of signals, etc., will be sent via the hypervisor interface to initialise that interface, and then, subsequently, the initialisation signals, etc., will be exchanged via the virtual machine interface in question when it is desired to (and to) initialise a virtual machine interface, etc.

Thus, in an embodiment, each input/output interface comprises one or more registers and a storage area, which after initialisation comprises a circular memory buffer (or buffers). In this arrangement, in an embodiment the circular memory buffers are used to store information (data) for tasks for the accelerator, during normal operation of the system, i.e. after initialisation, and the registers are used to indicate that data has been added to, or removed from, the circular memory buffers. In an embodiment the bits in the register reserved for the unique signals for the initialisation are not reused during normal operation, i.e. to allow for re-initialisation of the interface, e.g. when it is desired for the input/output interface to be allocated to a different virtual machine.

In one set of embodiments the input/output interfaces for the submission of tasks to the accelerator are accessible directly, e.g. by the virtual machines (i.e. in an embodiment the communication between the virtual machines and the virtual machine interfaces is independent of the hypervisor).

In an embodiment he input/output interfaces have associated memory addresses (address space), and in this case, each separate input/output interface is, in an embodiment, associated with (occupies) a different MMU (memory management unit) translation page of the system (and in an embodiment occupies an integer multiple of a full MMU translation page (page of address space)), as that will then facilitate the MMU page tables being used to control access to the input/output interfaces. Where the data processing system comprises a separate register for exchanging signals, e.g. a doorbell register, in an embodiment separate MMU pages are used for the storage area and for the register, and in an embodiment a separate MMU page is associated with each register and with each storage area of the one or more input/output interfaces.

Each input/output interface for the submission of tasks (e.g. virtual machine interfaces) can accept at least one task for the accelerator. There may only be one input/output interface for the submission of tasks, but in an embodiment there is a plurality of such input/output interfaces (e.g. 4 or 8), as discussed above. Where there are plural input/output interfaces, then in an embodiment the system further comprises an accelerator task scheduler that can arbitrate between tasks allocated to the task submission input/output interfaces and cause the accelerator to execute tasks that are allocated to these input/output interfaces. It would also be possible to execute tasks from several input/output interfaces in parallel if desired (and the accelerator has that capability). Where there are plural task submission input/output interfaces, then in an embodiment different applications (and different applications from different virtual machines, where present) can concurrently access the separate input/output interfaces.

The task or tasks to be performed by the accelerator can be any desired and suitable tasks (e.g. depending on the nature of the accelerator), such as, and in an embodiment, a compute job. In an embodiment it is one of: drawing an object on a screen, composing multiple graphic layers into a display frame, filtering an image to reduce noise, processing data (e.g. encrypting it, wrapping it with applicable protocol layers) and, e.g., transmitting it over a network, spell checking a text against a dictionary, evaluating a time increment in a physics model, etc.

It is believed that the technology described herein will, inter alia, be suitable for the low latency synchronous dispatch of small compute jobs (and so in an embodiment, the task or tasks is or are small compute jobs), and for asynchronous dispatch and other tasks, such as graphics acceleration.

The applications may be any suitable application, such as games, camera applications, image processing applications, browsers, web servers, productivity applications (word processors, spread sheets etc.), etc.

The plural applications that are using the accelerator as a common shared resource may comprise, for example, multiple applications within a single operating system, applications distributed across multiple virtual machines (operating systems) hosted on a single (physical) processor, applications operating on multiple physical (host) processors (whether as virtual machines or not), or any combination of this. Thus, the data processing system may comprise, for example, multiple applications operating under a single operating system, multiple virtual machines operating on a single physical host processor, or multiple host physical processors (each then, e.g., hosting one or more virtual machines), or any combination thereof. Furthermore, a virtual machine (operating system) may be run across multiple physical processors, and similarly a physical processor may be time-shared between multiple virtual machines, as described above.

Thus the accelerator, e.g. graphic processing unit, may be a common resource shared between plural processes in an individual virtual machine or physical processor, or shared between plural virtual machines and/or physical processors, etc.

In one set of embodiments, in addition to the initialisation process comprising the minimum steps of exchanging signals between the processor and the accelerator, the accelerator writing out capability information to the storage area, the processor reading this information and the accelerator configuring the input/output interface, the initialisation comprises one or more further steps.

In an embodiment further signals are exchanged between the processor and the accelerator, e.g. to indicate the success or failure of various steps or commands in the initialisation process, and further pieces of information may be written to the storage area at different steps in the initialisation process. In an embodiment generally each of the steps in the initialisation process will succeed each other, e.g. depending on the success of the previous step, i.e. when one step in the initialisation process is not completed successfully the initialisation will stop and not continue onto the next stage. However in one set of embodiments when a step in the initialisation process fails, the initialisation process jumps back to a previous step, and thus repeats one or more steps, including the failed step, until the initialisation is completed successfully.

When the initialisation comprises multiple steps, in order to manage the progress of the initialisation process, including when it reverts back to a previous step, in an embodiment signals are exchanged at the beginning and end of each step, with the processor sending a signal to the accelerator at the start of each step and the accelerator sending a signal to the processor at the end of each step. Thus for each step of the initialisation process there is a confirmation that it is proceeding correctly, making the process robust, and also aiding quick identification of a problem, i.e. when signals are exchanged throughout the initialisation process, an error can be detected soon after it occurs, thus saving time compared to when only a signal indicating the success or failure of the complete initialisation was sent right at the end.

In a set of embodiments, the initialisation process comprises the step of placing the input/output interface to be initialised into an initial safe state. Generally this step will take place after the processor has sent the first signal to the accelerator, and before the accelerator writes out its capability information to the storage area.

In an embodiment the second signal is sent from the accelerator to the processor after the accelerator has written out its capability information to the storage area. In an embodiment he second signal is to confirm that the capability information is valid, i.e. it has been written to the storage area successfully, and, in an embodiment, also to confirm that the input/output interface has transitioned into the initial safe state. Therefore in an embodiment the second signal is only sent when both of these conditions are satisfied.

In an embodiment the initialisation process also comprises the step of the processor writing one or more initialisation parameters to the storage area. In an embodiment these initialisation parameters are determined by the processor requesting the initialisation of the input/output interface, e.g. depending on the input/output interface to be initialised and/or depending on the capability information, and then written to the storage area, from where they can be, and in an embodiment are, read by the accelerator. In an embodiment the initialisation parameters include the type of interface to initialise. This step is carried out following the processor reading the accelerator's capability information from the storage area, and also in response to the second signal being sent from the accelerator to the processor. In an embodiment the initialisation parameters that are set are based on the read accelerator capability information. Following this step, the processor sends the accelerator the third signal, to request that the accelerator configures the input/output interface, in an embodiment based on the initialisation parameters.

As indicated above, the step in the initialisation process of the accelerator configuring the input/output interface being initialised for the submission of tasks to the accelerator is carried out in response to the third signal being sent from the processor to the accelerator and, in an embodiment, uses initialisation parameters, e.g. which have been read from the storage area by the accelerator. In an embodiment the configuration process comprises configuring the storage area to be used for communication, e.g. the circular memory buffers and/or other data structure, for the input/output interface in question.

In an embodiment, following the configuration of the input/output interface, a fourth signal is sent from the accelerator to the processor indicating the outcome, e.g. the success or failure, of the configuration and thus the initialisation. In an embodiment, if the configuration fails, the initialisation process jumps back to the step of writing out the accelerator's capability information to the storage area (along with sending the fourth signal to indicate the failure of the configuration), and repeating the steps thereafter until the initialisation process is completed successfully.

In an embodiment the signals that help to indicate that the initialisation is progressing correctly are exchanged at each step of the initialisation process. When an error is detected the initialisation may be re-started or it may jump back to an earlier step. Furthermore, a request for initialisation of the one or more input/output interfaces may be received before an initialisation which is currently being performed has finished. In an embodiment, if this happens, the re-start of the initialisation overrides a previously request to initialise the one or more input/output interfaces. This helps to ensure that the system is initialised correctly.

The general initialisation process has a sequence which is common to all types of the one or more input/output interfaces. However, particularly with regard to the signals which are exchanged and the selected pieces of information which are written out to shared storage, in an embodiment the different types of interfaces to be initialised comprise some additional steps or features which are particular to that type of interface, as will be described below.

The one or more selected pieces of information that are representative of the capabilities of the accelerator are selected in the sense that the type of information, i.e. the field or variable, which is written out, is chosen from one or more known fields or variables that the accelerator can provide which are representative of its capabilities (but the value of each of the pieces of information may not be known until it is written out). The particular pieces of information written out could be selected depending on particular circumstances, e.g. the information could be written out at regular intervals and/or as a result of a trigger from other events or signals in the system. Such an event, for example, could be when an accelerator is added or about to be removed from the system, or when one of the operating systems (or hypervisor) requests to restart one of the input/output interfaces, e.g. to recover from unexpected software behaviour. In an embodiment such events are accompanied by one of the "reserved" signals, i.e. the sending of the first signal from the processor to the accelerator. Furthermore, the one or more selected pieces of information could be selected to differ depending on the type of trigger received by the accelerator.

In one set of embodiments the fields and/or variables of the selected pieces of information are determined in advance and the same set of information is provided each time the one or more selected pieces of information are written out, albeit with the current value for each of the fields and/or variables at the time at which the information is written out. Thus in this set of embodiments the system is arranged to write out these one or more selected pieces of information, and the system knows which pieces of information it is going to write out, but the value of the various fields or variables may not be known until they are written out, e.g. because they may vary with time depending on the state of the accelerator.

The one or more selected pieces of information which are written to the shared storage area, could be representative of a number of different capabilities of the accelerator. As is explained above, providing this information minimises the knowledge the input/output interfaces and the one or more processors (virtual machines), e.g. via the hypervisor, need to have of the accelerator, such that they do not need to submit individual requests for information to the accelerator, which will introduce latencies into the system. Not all the selected pieces of information may be required by each input/output interface or virtual machine, particularly each different type of input/output interface, however by providing this information upfront during initialisation in the shared storage area makes sure that this information is available in one place in case a request is subsequently made.

In an embodiment, the one or more selected pieces of information comprise one or more of: the size of the accelerator's local memory; the initialisation sequence status; the status of the input/output interfaces, e.g. the tasks or commands that are pending or running, as it is reasonably common when the state of an interface or virtual machine is loaded, saved or restored that this information will be needed, as well as for scheduling purposes for tasks. In addition, in an embodiment, the one or more selected pieces of information also or instead comprises one or more of: the version number of the accelerator; the firmware and/or hardware version of the accelerator; the size of memory available to each input/output interface; the number of possible input/output interfaces (which may depend on the size of the memory available to each input/output interface); and the accelerator ID register. Furthermore, the system may comprise one or more flags reserved to indicate future capabilities of the system.

As has been outlined above, the common initialisation process may be used to initialise a number of different input/output interfaces in the system, e.g. a hypervisor interface, a power management interface and a virtual machine interface. The one or more selected pieces of information written to the shared storage may differ depending on the type of input/output interface being initialised. The specific cases of the hypervisor interface initialisation and the virtual machine interface initialisation will now be discussed.

In an embodiment, if the input/output interface being initialised is the hypervisor interface, the selected pieces of "capability" information that are written by the accelerator comprise one or more of (and in an embodiment all of): the number of input/output interfaces that the system can support, the size of the shared storage area available to the input/output interfaces, and the ratio of these two pieces of information, i.e. the ratio of the number of input/output interfaces to the size of the storage area available to them. In an embodiment, when initialising the hypervisor interface, the number of input/output virtual machine interfaces to support is selected, and thus this may affect the size of the storage area available to them, e.g. when the size of the storage area is fixed.

The selected pieces of information may also comprise the version of the interface initialisation information structure that the accelerator supports, as this allows future extensions of the system, and/or the firmware and/or hardware version numbers for the accelerator. In an embodiment, these selected pieces of information are written out to the storage area by the accelerator in the first step of the initialisation process, e.g. after the first signal is sent from the processor to the accelerator and before the second signal is sent from the accelerator to the processor.

In the case of hypervisor interface initialisation, in an embodiment the initialisation parameters that are written by the processor in response to the second signal from the accelerator (e.g.) comprise the number of other interfaces, e.g. power management and/or virtual machine interfaces (in addition to the hypervisor interface), to be initialised. This may also indirectly determine the memory size available for each of the virtual machine interfaces. The parameter information may also comprise the version of the hypervisor interface protocol to initialise. This facilitates future extensions of the initialisation information and/or of the communication mechanism used in the system after initialisation. In an embodiment these pieces of initialisation information are written out to the storage area by the processor during the initialisation of the hypervisor interface, e.g. following the second signal being sent from the accelerator to the processor.

In the case of hypervisor interface initialisation in an embodiment, the accelerator writes further selected pieces of information to the shared storage area once it has configured the hypervisor input/output interface. In an embodiment this information comprises the size of the memory required to store the state of a virtual machine interface and/or of the virtual machine interfaces (should it be required to save the state of one of the input/output virtual machine interfaces to memory). Having the accelerator provide this information helps to decouple the internal function of the accelerator from the hypervisor. This information may also comprise the offset and size of the hypervisor interface structure. This allows greater flexibility in allocating an area of memory available for use by the hypervisor interface. In an embodiment these pieces of selected pieces of information are written out to the storage area after the hypervisor interface has been configured, e.g. before the accelerator sends a fourth signal to the processor to indicate the success (or failure) of the initialisation. Alternatively these selected pieces of information could be written out to the storage area as part of the initialisation parameters, e.g. when the size of the memory required to store the state of a virtual machine interface does not depend on the number of virtual machine interfaces or other parameters for the initialisation of the hypervisor interface.

If the input/output interface being initialised is a virtual machine interface, in an embodiment the selected pieces of "capability" information written out by the accelerator comprise: the size of the memory allocated to the virtual machine interface and/or the overall size of the memory allocated to all of the virtual machine interfaces. In an embodiment the selected pieces of information also comprise the version of the interface initialisation information structure that the accelerator supports and/or the firmware and/or hardware version numbers for the accelerator. In an embodiment these selected pieces of information are written out to the shared storage by the accelerator in the first step of the initialisation process, e.g. after the first signal is sent from the processor to the accelerator and before the second signal is sent from the accelerator to the processor.

In the case of virtual machine interface initialisation, in an embodiment the initialisation parameters that are written by the processor in response to the second signal from the accelerator (e.g.) comprise the version of the virtual machine interface protocol to initialise for the virtual machine interface. This facilitates future extensions of the initialisation information and/or of the communication mechanism used in the system after initialisation. In an embodiment these pieces of initialisation information are written out to the storage area by the processor during the initialisation of the virtual machine interface, e.g. following the second signal being sent by the accelerator to the processor.

In an embodiment, for the initialisation of a virtual machine interface, no further of selected pieces of information are written out to the storage area at a later stage of the initialisation process, e.g. after the virtual machine interface has been configured.

The technology described herein can be implemented in any suitable system, such as a suitably configured microprocessor based system. In an embodiment, the technology described herein is implemented in a computer and/or micro-processor based system.

The data processing system may also comprise, and in an embodiment does also comprise, and/or is in communication with, one or more memories and/or memory devices that store the data described herein, and/or that store software for performing the processes described herein. The data processing system may also be in communication with a host microprocessor, and/or with a display for displaying images based on the data described above, and/or with a graphics processor for processing the data described above.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in an embodiment do, include, as appropriate, any one or more or all of the features described herein.

The methods of the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a data processing system, processor, or microprocessor system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows schematically a data processing system 1 in which an accelerator (GPU) 12 that comprises an execution unit 2, a scheduler 9 and a hypervisor interface (HVIF) 18 acts as a common shared resource for plural applications (app) 3 executing on respective virtual machines (VM) 4, 5. (As shown in FIG. 1, and as will be appreciated by those skilled in the art, each virtual machine 4, 5 is hosted on a host processor (CPU) 13 and comprises a respective operating system (OS) 6, 7 that is executing on the host processor 13 to provide the "virtual machine", and there are respective applications 3 operating within each operating system 6, 7 (virtual machine 4, 5) that will then use the execution unit 2 as a resource.)

In order to allow the applications to use the execution unit 2 to perform tasks, the execution unit 2 has an associated input/output interface module (VMIF module) 11 comprising one or more associated sets of registers 8 and a storage area 14 (partitioned into regions which are associated with the one or more virtual machines 4, 5) which together function as virtual machine input/output interfaces for submitting tasks to the execution unit 2 (and thus to the accelerator 12) and that the respective operating system 6, 7 can store information needed by the execution unit 2 in when the execution unit 2 (the accelerator 12) is to perform a task for a given application. FIG. 1 shows a system with four sets of registers 8, although other arrangements would, of course, be possible. As shown in FIG. 1, when an application wishes to use the execution unit 2 to perform a task, it will access a set of the registers 8 of the execution unit 2 via its respective operating system 6, 7.

FIG. 1 also shows a scheduler 9 that acts to arbitrate between and schedule tasks in the registers 8. As shown in FIG. 1, the system will also include a hypervisor 10, executed on the CPU 13, that interfaces between the respective virtual machines 4, 5 (operating systems 6, 7) and the virtual machine input/output interfaces of the accelerator (execution unit 2) 12, and a hypervisor interface 18 on the accelerator 12 which, inter alia, allocates virtual machines 4, 5 wishing to access the accelerator's resources to the virtual machine input/output interfaces. The overall hypervisor interface 18 again comprises one or more registers for signalling and a circular memory buffer 14 for the exchange of data.

The host processor 13, the virtual machines 4, 5 and the accelerator 12 are also connected to the storage area 14. The accelerator 12 and the host processor 13 are arranged to exchange signals via registers 8, and the accelerator 12 is arranged to write out information representative of its capabilities to the storage area 14 where it can be read by the host processor 13 and the virtual machines 4, 5, as will be explained in more detail below. The host processor 13 is also arranged to write out initialisation parameters to the storage area 14 where they can be read by the accelerator 12.

Figure 2:
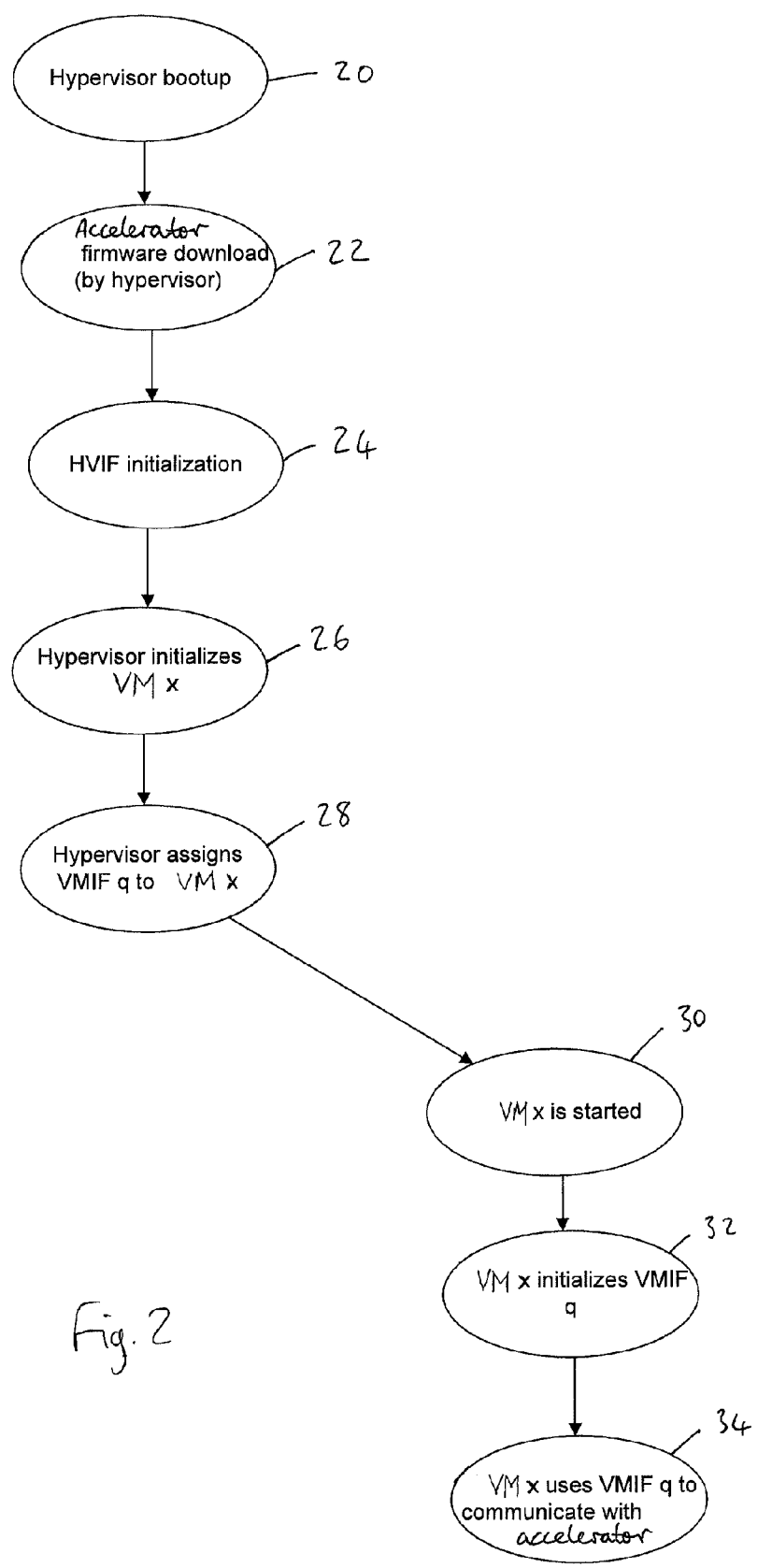
FIG. 2 shows overall operation of an embodiment of a data processing system.

FIG. 2 shows a flow chart for overall operation of the data processing system 1. Operation of the data processing system 1 will now be described with reference to the components shown in FIG. 1 and the steps shown in FIG. 2.

At some point following starting operating of the data processing system 1, e.g. when it is powered on, the hypervisor 10 boots up (step 20, FIG. 2) and the accelerator's firmware is downloaded by the hypervisor 10 from a file in the file system used by the hypervisor (step 22, FIG. 2). The hypervisor 10 verifies the integrity of the firmware, copies it into the accelerator's local memory and starts the accelerator 12. The details of these steps are known to the skilled person and their specifics are not of particular relevance to the technology described herein.

Next, the hypervisor interface (HVIF) 18 is initialised (step 24, FIG. 2) as will be described in more detail below. The hypervisor interface 18 is initialised whenever the data processing system 1 is powered on, however this is not necessary for the subsequent initialisation of the virtual machine input/output output interfaces because they do not need to have any knowledge of the power state of the data processing system 1.

Once the hypervisor interface 18 has been initialised, the hypervisor 10 can initialise a particular virtual machine 4, 5, (VM x), e.g. that wishes to submit a task to the execution unit 2 on the accelerator 12 (step 26, FIG. 2). The hypervisor 10 then assigns a particular virtual machine input/output interface (VMIF q) to the VM x (step 28, FIG. 2), the VM x is started (step 30) and the host processor 13 for the VM x initialises the VMIF q (step 32, FIG. 2), as will also be described in more detail below. Following this initialisation, the VM x is able to use the VMIF q to communicate with the accelerator 12 (step 34, FIG. 2) and thus submit tasks to the execution unit 2.

The initialisation of the hypervisor interface 18 will now be described in more detail with reference to the flow chart of FIG. 3, the signalling diagram of FIG. 4 and the components of FIG. 1. First, the host processor 13 (to the virtual machines 4, 5) requests initialisation of the hypervisor interface (HVIF) 18 by setting bit "0" of a register in the HVIF 18, i.e. from 0 to 1, to send a signal from the host processor 13 to the accelerator 12 (step 40, FIGS. 3 and 4). On receiving the bit "0" signal, the accelerator 12 resets the hypervisor interface 18 to an initial safe state, if necessary first cancelling any ongoing tasks related to the hypervisor interface 18, e.g. aborting any previous operation related to the hypervisor interface 18 being initialised (step 42, FIGS. 3 and 4).

Figure 3:
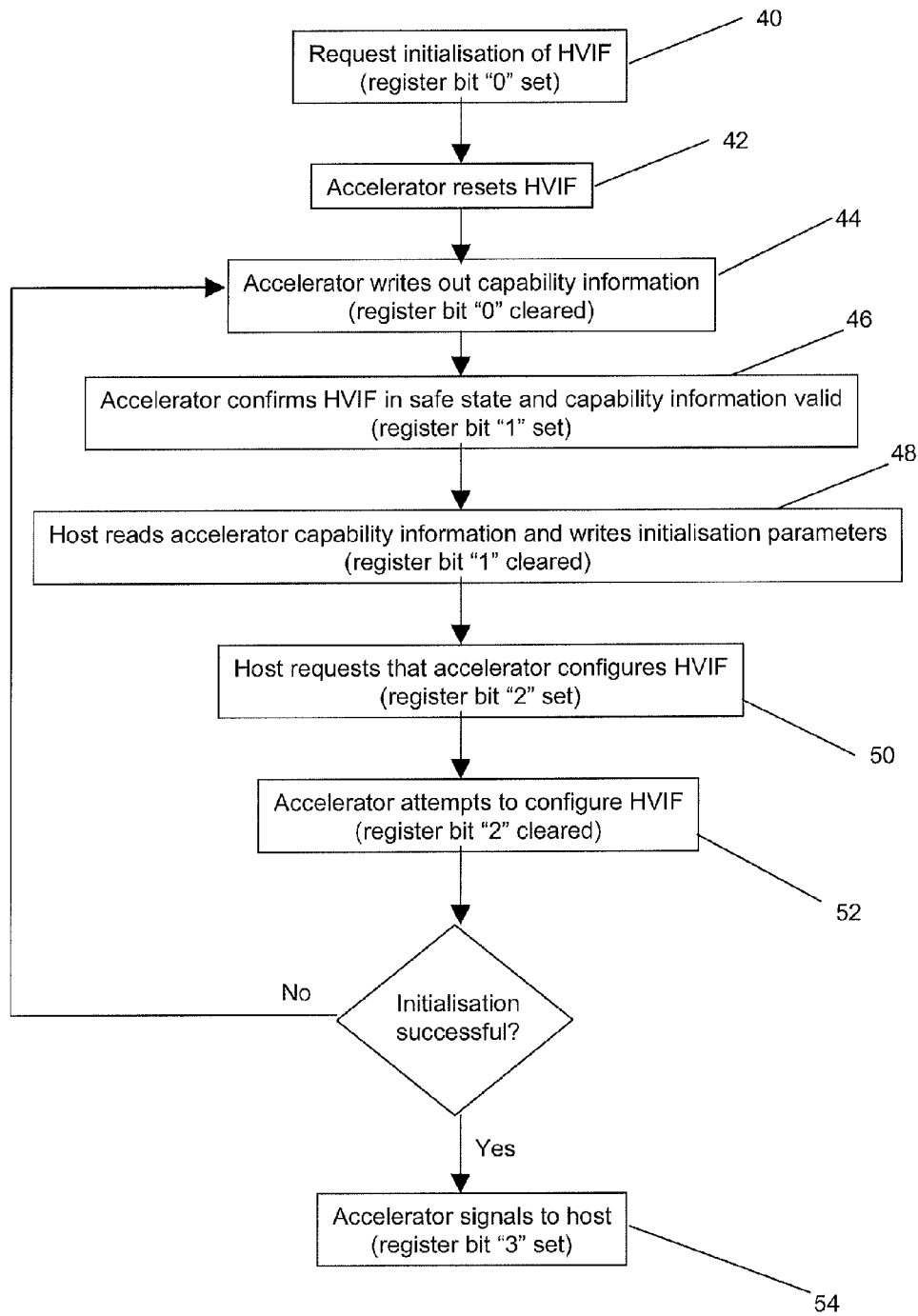
FIG. 3 shows operation of an embodiment of the initialisation of a hypervisor interface.
Figure 4:
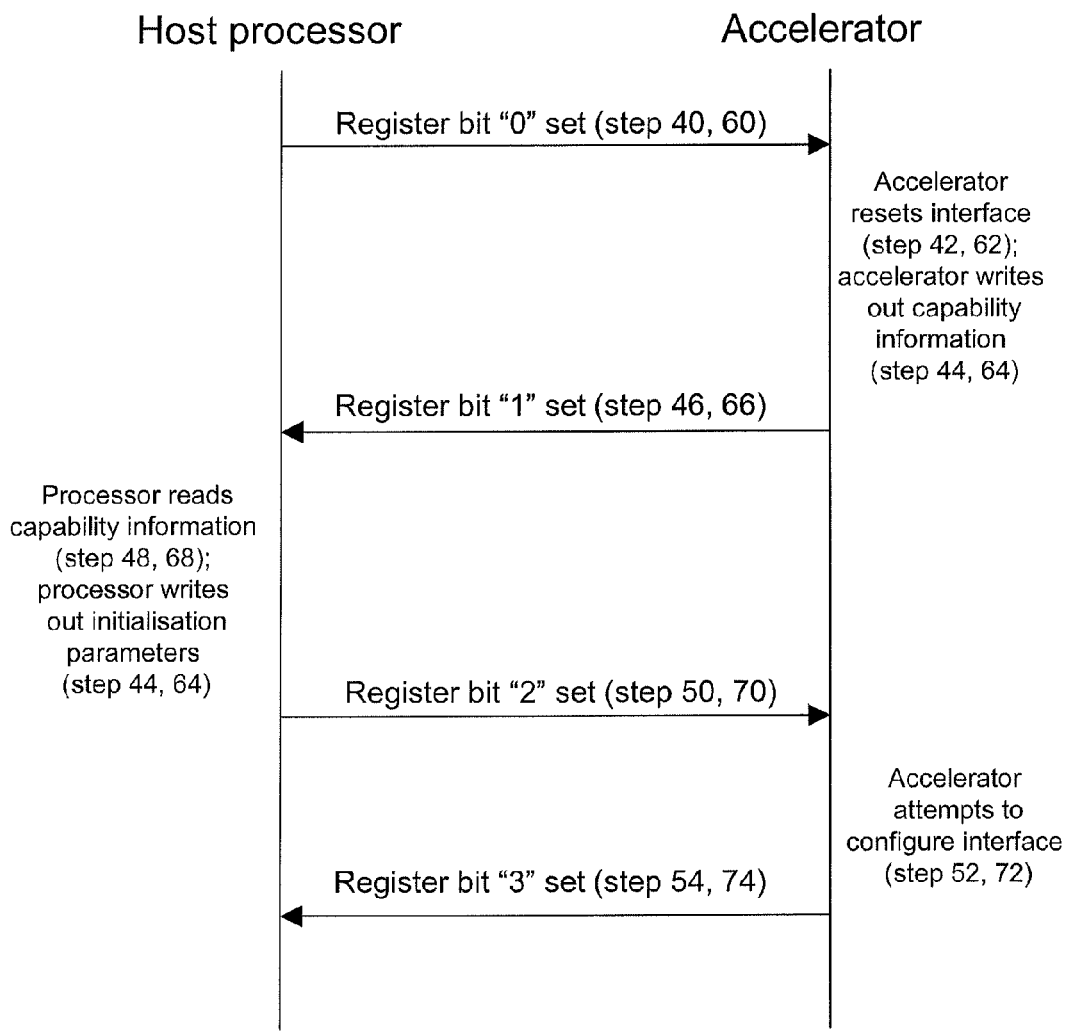
FIG. 4 shows a signalling diagram associated with FIG. 3.

Next, the accelerator 12 writes out information representative of its capabilities to the storage area 14 associated with the hypervisor interface 18, e.g. the accelerator version, the different hypervisor interface protocols supported, how many virtual machine input/output interfaces are supported, etc., and clears register bit "0" (step 44, FIGS. 3 and 4). Once steps 42 and 44 have been completed successfully, i.e. all ongoing tasks aborted and the accelerator's capabilities written out, the accelerator 12 responds to the host processor 13 that the hypervisor interface 18 has transitioned into an initial safe state and that the information representative of the accelerator's capabilities is valid, by setting bit "1" of the HVIF register, thereby sending a signal from the accelerator 12 to the host processor 13 (step 46, FIGS. 3 and 4).

In response to the register bit "1" signal from the accelerator 12, the host processor 13 reads the information representative of the accelerator's capabilities from the storage area 14 and writes any required initialisation parameters, e.g. the requested hypervisor interface protocol to use, to the storage area 14, and clears register bit "1" (step 48, FIGS. 3 and 4). The host processor 13 then requests that the accelerator 12 configures the hypervisor interface 18 by setting bit "2" in the HVIF register to send a signal to the host processor 13 from the accelerator 12 (step 50, FIGS. 3 and 4).

On receiving the register bit "2" signal from the host processor 13, the accelerator 12 attempts to configure the hypervisor interface 18, and clears register bit "2" (step 52, FIGS. 3 and 4). Step 52 includes configuring a region of the storage area 14 as a circular memory buffer for use by the hypervisor 10 to store information for controlling accelerator. When this attempt is successful, the accelerator 12 sets bit "3" of the HVIF register to send a signal to the host processor 13 (step 54, FIGS. 3 and 4). At this stage the accelerator 12 may also write out further information representative of its capabilities to the storage area 14, e.g. the amount of memory required to save the state of each virtual machine input/output interface.

If the attempt to configure the hypervisor interface 18 fails, the initialisation process reverts back to step 44, i.e. the accelerator 12 writes out information representative of its capabilities to the storage area 14, with all the following steps happening subsequently until the initialisation has completed successfully.

Once the hypervisor interface 18 has been initialised, the virtual machine input/output interfaces can be initialised to allow the virtual machines 4, 5 to submit tasks to the accelerator 12 for execution. The initialisation of a virtual machine input/output interface is very similar to the initialisation of the hypervisor interface 18, and will now be described in more detail with reference to the flow chart of FIG. 5, the signalling diagram of FIG. 4 and the components of FIG. 1.

First, the hypervisor 10 allocates one of the virtual machine input/output interfaces to a virtual machine 4, 5 that wishes to submit tasks to the accelerator 12 (step 58). Then the host processor 13 (to the virtual machines 4, 5) requests initialisation of a virtual machine input/output interface by setting bit "0" of the register 8 of the virtual machine interface in question, i.e. from 0 to 1, to send a signal from host processor 13 to the accelerator 12 (step 60, FIGS. 4 and 5). On receiving the bit "0" signal, the accelerator 12 resets the virtual machine input/output interface to an initial safe state, if necessary first cancelling any ongoing tasks related to the virtual machine input/output interface, e.g. aborting any previous operation related to that particular virtual machine input/output interface being initialised (step 62, FIGS. 4 and 5).

Figure 5:
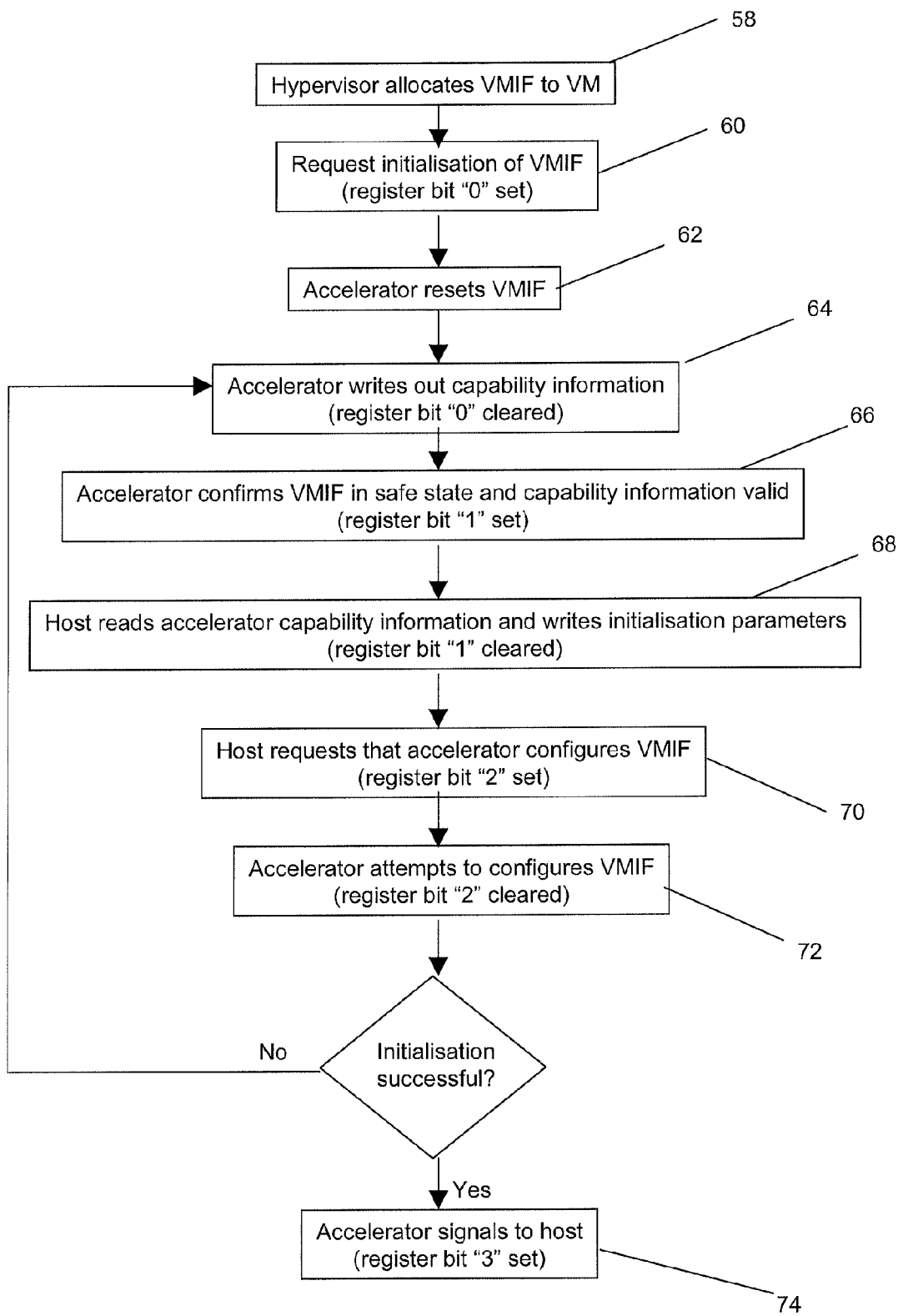
FIG. 5 shows operation of an embodiment of the initialisation of a virtual machine interface.

Next, the accelerator 12 writes out information representative of its capabilities to the region of the storage area 14 for the virtual machine input/output interface in question, e.g. the accelerator version, the different virtual machine input/output interface protocols supported, how many virtual machine input/output interfaces are supported, etc., and clears register bit "0" (step 64, FIGS. 4 and 5). Once steps 62 and 64 have been completed successfully, i.e. all ongoing tasks aborted and the accelerator's capabilities written out, the accelerator 12 responds to the host processor 13 that the virtual machine input/output interface 11 has transitioned into an initial safe state and that the information representative of the accelerator's capabilities is valid, by setting bit "1" of the appropriate register 8, thereby sending a signal from the accelerator 12 to the host processor 13 (step 66, FIGS. 4 and 5).

In response to the register bit "1" signal from the accelerator 12, the host processor 13 reads the information representative of the accelerator's capabilities from the appropriate region of the storage area 14 and writes any required initialisation parameters, e.g. the requested virtual machine input/output interface protocol to use, to the storage area 14, and clears register bit "1" (step 68, FIGS. 4 and 5). The host processor 13 then requests that the accelerator 12 configures the virtual machine input/output interface by setting bit "2" in the appropriate register 8 to send a signal from the host processor 13 to the accelerator 12 (step 70, FIGS. 4 and 5).

On receiving the register bit "2" signal from the host processor 13, the accelerator 12 attempts to configure the virtual machine input/output interface, and clears register bit "2" (step 72, FIGS. 4 and 5), i.e. by configuring the register 8 and a region of the storage area 14 as a circular memory buffer which will function as the virtual machine input/output interface for submission of tasks to the accelerator 12. When this attempt is successful, the accelerator 12 sets bit "3" of the appropriate register 8 to send a signal to the host processor 13 (step 74, FIGS. 4 and 5). At this stage the accelerator 12 may also write out further information representative of its capabilities to the storage area 14, e.g. the amount of memory required to save the state of each virtual machine input/output interface.

If the attempt at configuring the virtual machine input/output interface fails, the initialisation process reverts back to step 64, i.e. the accelerator 12 writes out information representative of its capabilities to the appropriate circular memory buffer 14, with all the following steps happening subsequently until the initialisation has completed successfully.

The initialisation of one or the virtual machine input/output interfaces takes place whenever a virtual machine 4, 5, that does not already have an allocated virtual machine input/output interface, wishes to submit a set of tasks to the accelerator 12. If there is a free virtual machine input/output interface then that can simply be allocated to the virtual machine. If there are no free virtual machine input/output interfaces then the hypervisor 10 may choose to end a running task on the accelerator 12 in order to connect another virtual machine 4, 5, e.g. with a pending task of higher priority, to the accelerator 12. Following initialisation of the virtual machine input/output interfaces, the virtual machines 4, 5 have access to the resources of the accelerator 12 and can thus submit tasks to be run on the execution unit 2 of the accelerator 12.

As discussed above, with the technology described herein, following initialisation of the hypervisor interface 18 and also the subsequent initialisation of the virtual machine input/output interfaces, generic communication may be enabled because the accelerator 12 has provided information representative of its capabilities to the memory 14, which is accessible by the virtual machines 4, 5. Therefore a number of generic commands for initialising and subsequently controlling the virtual machine input/output interfaces can be used by the hypervisor. In an embodiment, a sample set of generic commands is as follows:

INIT: initialise and reset a virtual machine input/output interface;
DISABLE: disable a virtual machine input/output interface and stop any task running via the interface;
ENABLE: enable a virtual machine input/output interface;
SAVE: save the state of a virtual machine input/output interface to memory. The hypervisor provides the location of the memory area to the accelerator to allow it to save the virtual machine input/output interface, with the size of the memory having already been provided by the accelerator to the memory during initialisation of the hypervisor interface; and
LOAD: load a saved virtual machine input/output interface from the memory.

Furthermore, numerous variants of these commands are possible, e.g. a combined DISABLE and SAVE command.

During operation of the accelerator 12, the accelerator 12 may stall, e.g. owing to a task that is being executed never finishing or an error occurring. This may result in a deadlock of the accelerator 12, such that it is unable to process any further tasks without being reset. At the time the accelerator 12 stalls or deadlocks, one or more virtual machines 4, 5 may be connected, via their respective virtual machine input/output interfaces, to the accelerator 12 and running tasks on the accelerator's execution unit 2.

In this situation, the accelerator 12 will need to be reset in order that it can resume operation. However, such a reset will disconnect it from the virtual machines 4, 5 and may jeopardise the successful execution of any tasks that were being executed by the execution unit 2 when the accelerator 12 stalled. In order that the accelerator 12 is reset in manner which helps the virtual machines 4, 5 to reconnect to the accelerator 12 and finish executing their partially completed tasks, in an embodiment the following operation is performed.

When the accelerator 12 stalls or deadlocks, the hypervisor 10 detects this, via its interface 18 with the accelerator 12. The hypervisor 10 then un-maps all the virtual machine input/output interfaces that are connected to the accelerator 12, as well as any power management interfaces. The accelerator 12 is then reset by the hypervisor 10 using the operation outlined above for the initial start-up of the accelerator 12, i.e. the accelerator's firmware is uploaded.

Upon reset of the accelerator 12, e.g. after the boot-up of the accelerator's firmware, the accelerator 12 sets a bit in the respective registers 8 of the virtual machine input/output interfaces in question, i.e. those which were previously connected to the accelerator 12. In a similar manner to that described above for signalling between the accelerator and the host processor, the setting of this bit sends a signal from the accelerator 12 to the respective drivers of these virtual machines 4, 5 indicating that their respective registers 8 are to be read. By reading the bit that has been set in their respective registers 8, the previously connected virtual machines 4, 5 are thus informed that their respective input/output interfaces need to be re-initialised.

The drivers of the virtual machines 4, 5 in question then re-initialise their respective input/output interfaces and the hypervisor 10 restores the connection of the virtual machine input/output interfaces to the accelerator 12. This allows the reconnected virtual machines 4, 5 to re-submit their partially completed tasks to the execution unit 2 for their execution to be completed.

For other interfaces connected to the accelerator 12 when it stalls or deadlocks, and has to be reset, e.g. the power management interface(s), a similar register bit is, in an embodiment, set by the accelerator 12 (e.g. following an interface initialisation command from the hypervisor 10 for that interface) in the respective registers of these interfaces to signal that the interfaces need to be re-initialised and their connection to the accelerator 12 restored.

It can be seen from the above that in some embodiments of the data processing system 1, the accelerator 12 and the host processor 13 which, when an input/output interface for the accelerator is to be initialised, exchange initialisation signals to start the initialisation process, and subsequently confirm that the various steps of the initialisation process have completed successfully by exchanging further signals, finishing with the input/output interface having been configured successfully.

The accelerator 12 writes out information regarding its capabilities to a shared storage area 14 so that it is readily available to the host processor 13 and the virtual machines 4, 5 when they require this information. This simple initialisation process allows it to be used for multiple different types of interfaces, with only the specific details, i.e. the types of signals and/or the particular pieces of information, being tailored to the different interfaces being initialised, as will be discussed in more detail below. Providing this information allows the subsequent communication between the virtual machines 4, 5 and the accelerator 12, via the input/output interfaces to be generic in nature. This is because the host processor 13 which is requesting initialisation of the input/output interfaces does not need to make subsequent requests for accelerator's capability information, as this is been provided upfront in the storage area during the initialisation process.

Furthermore, the accelerator 12 knows that during the initialisation process it needs to respond to the first signal from the host processor 13 by writing out its capability information to the storage area and send a second signal to the host processor 13. This particular sequence of events is the same for a number of different input/output interfaces, e.g. the hypervisor interface 18, the virtual machine interfaces and the power management interface. Thus a simple, common and robust protocol comprising the exchange of defined signals and the provision of information gives a common initialisation process which can be used independently across different interfaces, systems and accelerators, e.g. a hypervisor interface, a power management interface and virtual machine interfaces.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of initialising an a hypervisor interface for the control of an accelerator that acts as a shared resource in a data processing system, wherein the data processing system comprises:
   one or more processors that each execute one or more operating systems, each operating system including one or more applications;
   an accelerator that provides a shared resource for a plurality of the applications;
   a storage area accessible by at least the one or more processors and the accelerator;
   one or more input/output interfaces for the control of the accelerator, wherein the one or more input/output interfaces comprise one or more hypervisor interfaces; and
   a hypervisor that manages the allocation of input/output interfaces to the one or more processors;
   the method comprising, to initialise one of the a hypervisor interfaces:
   one of the one or more processors sending a first signal to the accelerator;
   the accelerator, in response to receiving the first signal, writing one or more selected pieces of information representative of one or more capabilities of the accelerator to the storage area, and sending a second signal to the processor;
   the processor, in response to receiving the second signal, reading the one or more selected pieces of information from the storage area;
   the processor sending a third signal to the accelerator; and
   the accelerator configuring the a hypervisor interface in response to the third signal from the processor.

2. A method as claimed in claim 1, further comprising the step of the processor writing a set of initialisation parameters to the storage area in response to receiving the second signal from the accelerator, wherein the step of the accelerator configuring the a hypervisor interface is based on the initialisation parameters.

3. A method as claimed in claim 1, further comprising the step of the accelerator sending a fourth signal to the processor indicating the success of the configuration of the a hypervisor interface being initialised or the step of reverting back to the accelerator writing out one or more selected pieces of information representative of one or more capabilities of the accelerator to the storage area, and sending a second signal to the processor.

4. A method as claimed in claim 1, further comprising the step of the accelerator placing the a hypervisor interface to be initialised into an initial safe state in response to receiving the first signal.

5. A method as claimed in claim 1, wherein the second signal is sent to confirm that the one or more selected pieces of information are valid and that the a hypervisor interface to be initialised has transitioned into an initial safe state.

6. A method as claimed in claim 1,
   further comprising:
   the accelerator writing as the selected pieces of capability information one or more of: the size of the memory required to store an input/output interface context, the number of input/output interfaces that the system can support, the size of the storage area available to the input/output interfaces, and the ratio of the number of input/output interfaces to the size of the storage area available to them; and
   the processor writing a set of initialisation parameters to the storage area in response to receiving the second signal from the accelerator, which initialisation parameters comprise one or more of the number of other interfaces in addition to the hypervisor interface to be initialised and the version of the hypervisor interface protocol to initialise.

7. A method as claimed in claim 1, wherein the first and second signals are unique to the initialisation process and/or comprise a priority flag.

8. A data processing system comprising:
   one or more processors that each execute one or more operating systems, each operating system including one or more applications;
   an accelerator that provides a shared resource for a plurality of the applications;
   a storage area accessible by at least the one or more processors and the accelerator;
   one or more input/output interfaces for the control of the accelerator, wherein the one or more input/output interfaces comprise one or more hypervisor interfaces; and
   a hypervisor that manages the allocation of input/output interfaces to the one or more processors;
   wherein, at least one of the one or more processors is capable of, to initialise one of the a hypervisor interfaces, sending a first signal to the accelerator;

the accelerator is capable of, in response to receiving the first signal, writing one or more selected pieces of information representative of one or more capabilities of the accelerator to the storage area, and sending a second signal to the processor;

the processor is capable of, in response to the second signal, reading the one or more selected pieces of information from the storage area, and sending a third signal to the accelerator; and the accelerator is capable of, in response to the third signal from the processor, configuring the a hypervisor interface.

9. A system as claimed in claim 8, wherein the host processor is further capable of writing a set of initialisation parameters to the storage area in response to receiving the second signal from the accelerator, and the accelerator is capable of configuring the a hypervisor interface based on the initialisation parameters.

10. A system as claimed in claim 8, wherein the accelerator is further capable of sending a fourth signal to the processor indicating the success of the configuration of the a hypervisor interface being initialised or reverting back to writing out one or more selected pieces of information representative of one or more capabilities of the accelerator to the storage area, and sending a second signal to the processor.

11. A system as claimed in claim 8, wherein the accelerator is further capable of placing the a hypervisor interface to be initialised into an initial safe state in response to receiving the first signal.

12. A system as claimed in claim 8, wherein the second signal is sent to confirm that the one or more selected pieces of information are valid and that the a hypervisor interface to be initialised has transitioned into an initial safe state.

13. A system as claimed in claim 8, wherein:
the accelerator is capable of writing as the selected pieces of capability information one or more of: the size of the memory required to store an input/output interface context, the number of input/output interfaces that the system can support, the size of the storage area available to the input/output interfaces, and the ratio of the number of input/output interfaces to the size of the storage area available to them; and the processor is capable of writing a set of initialisation parameters to the storage area in response to receiving the second signal from the accelerator, which initialisation parameters comprise the number of other interfaces in addition to the hypervisor interface to be initialised, and the version of the hypervisor interface protocol to initialise.

14. A system as claimed in claim 8, wherein the first and second signals are unique to the initialisation process and/or comprise a priority flag.

15. A non-transitory computer readable storage medium storing computer software code which when executing on a processor performs a method of initialising an input/output interface for the control of an accelerator that acts as a shared resource in a data processing system, wherein the data processing system comprises:

one or more processors that each execute one or more operating systems, each operating system including one or more applications;

an accelerator that provides a shared resource for a plurality of the applications;

a storage area accessible by at least the one or more processors and the accelerator;

one or more input/output interfaces for the control of the accelerator, wherein the one or more input/output interfaces comprise one or more hypervisor interfaces; and a hypervisor that manages the allocation of input/output interfaces to the one or more processors;

the method comprising, to initialise one of the a hypervisor interfaces:

one of the one or more processors sending a first signal to the accelerator;

the accelerator, in response to receiving the first signal, writing one or more selected pieces of information representative of one or more capabilities of the accelerator to the storage area, and sending a second signal to the processor;

the processor, in response to receiving the second signal, reading the one or more selected pieces of information from the storage area;

the processor sending a third signal to the accelerator; and the accelerator configuring the a hypervisor interface in response to the third signal from the processor.

* * * * *

UNITED STATES PATENT AND TRADEMARK OFFICE
CERTIFICATE OF CORRECTION

PATENT NO.        : 9,454,397 B2
APPLICATION NO.   : 14/682302
DATED             : September 27, 2016
INVENTOR(S)       : Persson et al.

Page 1 of 1

It is certified that error appears in the above-identified patent and that said Letters Patent is hereby corrected as shown below:

In the Claims
Col. 21, line 46, claim 1: After "initialising" and before "a" delete "an".
Col. 21, line 62, claim 1: After "the" and before "hypervisor" delete "a".
Col. 22, line 8, claim 1: After "the" and before "hypervisor" delete "a".
Col. 22, line 14, claim 2: After "the" and before "hypervisor" delete "a".
Col. 22, lines 18-19, claim 3: After "the" and before "hypervisor" delete "a".
Col. 22, line 25, claim 4: After "the" and before "hypervisor" delete "a".
Col. 22, line 30, claim 5: After "the" and before "hypervisor" delete "a".
Col. 22, line 66, claim 8: After "the" and before "hypervisor" delete "a".
Col. 23, line 11, claim 8: After "the" and before "hypervisor" delete "a".
Col. 23, line 17, claim 9: After "the" and before "hypervisor" delete "a".
Col. 23, lines 21-22, claim 10: After "the" and before "hypervisor" delete "a".
Col. 23, line 29, claim 11: After "the" and before "hypervisor" delete "a".
Col. 23, line 34, claim 12: After "the" and before "hypervisor" delete "a".
Col. 24, lines 28-29, claim 15: After "the" and before "hypervisor" delete "a".
Col. 24, line 41, claim 15: After "the" and before "hypervisor" delete "a".

Signed and Sealed this
Twentieth Day of December, 2016

Michelle K. Lee
*Director of the United States Patent and Trademark Office*